UNITED STATES PATENT OFFICE.

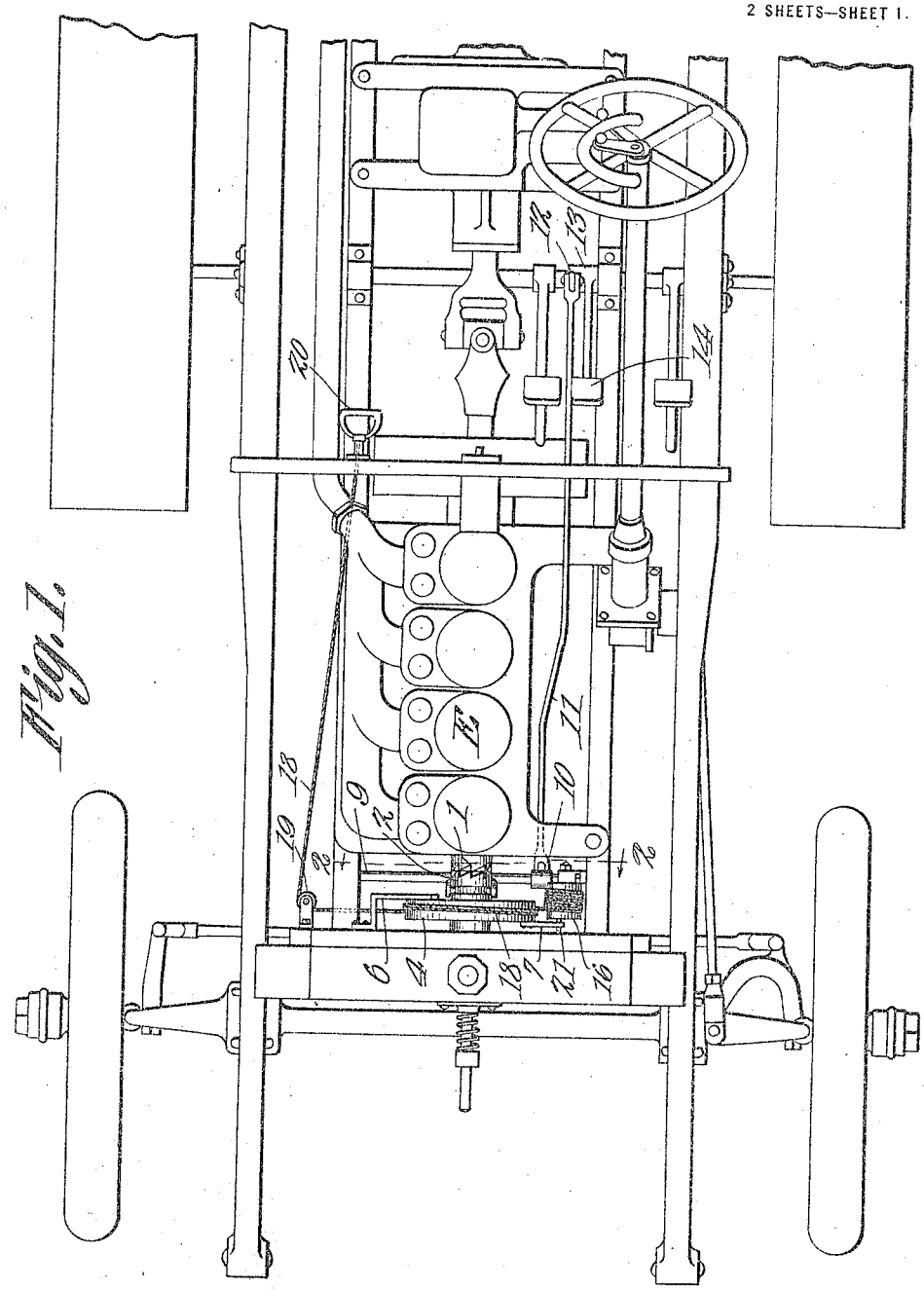

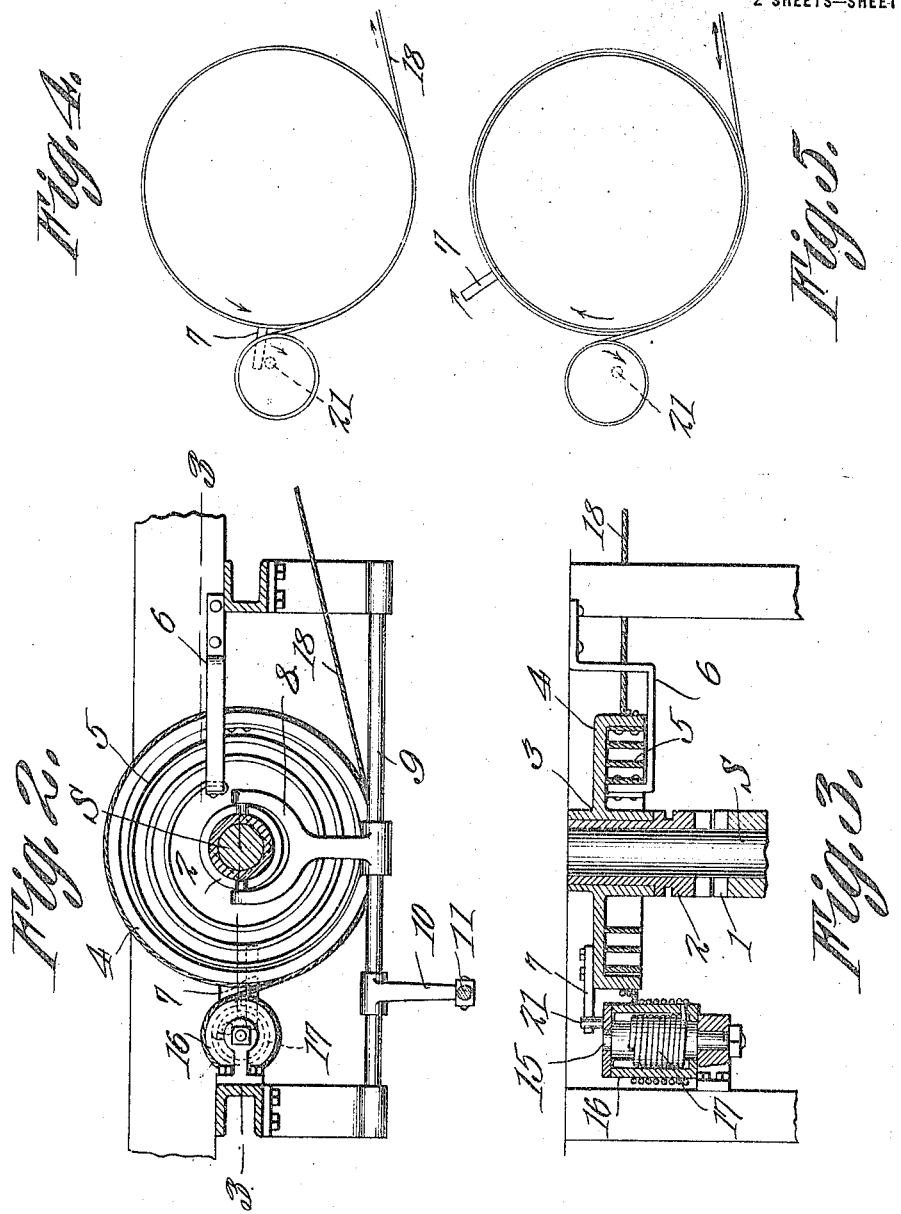

MARY PIERSON MITCHELL, OF EATON, OHIO.

MECHANICAL STARTING DEVICE FOR EXPLOSION-ENGINES.

1,141,198.

Specification of Letters Patent.

Patented June 1, 1915.

Application filed November 19, 1914. Serial No. 873,025.

*To all whom it may concern:*

Be it known that I, MARY P. MITCHELL, a citizen of the United States, residing at Eaton, in the county of Preble and State of Ohio, have invented a new and useful Mechanical Starting Device for Explosion-Engines, of which the following is a specification.

The present invention relates to improvements in mechanical starting devices for explosion engines.

One object of the invention, is the provision of a mechanical starter, which will permit of the starting or initial cranking of the explosion engine, without the operator or chauffeur leaving the seat of the automobile, the parts for operating the same being in ready access to the operator or chauffeur.

A further object of the present invention, is the provision of a simple, inexpensive and durable mechanism of this character, which is readily applied to automobiles now in use, and which is thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view partially in diagram of the forward portion of an automobile with the present mechanical starting mechanism in operable relation thereto. Fig. 2 is a section taken on line 2—2 of Fig. 1. Fig. 3 is a section taken on line 3—3 of Fig. 2. Figs. 4 and 5 are diagrammatic views showing the relative position of the cable carrying drum at the initial starting movement of the engine crank rotating drum and at the final movement thereof previous to the slacking of the cable.

Referring to the drawings, E designates the explosion engine of an automobile, stationary engine or aeroplane, whose crank shaft S is provided with the clutch teeth 1, for the reception of the sliding clutch member 2, which in turn is fixed to and rotates with the sleeve 3 of the drum or pulley 4. The drum or pulley 4 has one end of the flat spring 5 connected thereto, while the opposite end of said flat spring is connected to the brace or arm 6 which is supported from the frame of the automobile. It will thus be seen that as the drum 4 is rotated in opposition to wind the spring, that the same when released will be rotated by the spring. Carried by the drum 4 adjacent one edge of the periphery thereof, is a pin or arm 7, the purpose of which will presently appear.

The yoke arm 8, is operably connected to control the sliding clutch sleeve 2 and consequently move the same into and out of engagement with the clutch member 1, said arm being carried by the transversely disposed rock shaft 9, which is provided with the operating arm 10, to which is further connected, the rod 11 which extends rearwardly and is connected to the arm 12 of the sleeve 13, said sleeve 13 being mounted for rocking movement and being provided with a foot pedal 14. By this means, the operator by depressing the foot operates the yoke to place the sleeve clutch 2 into engagement with the clutch 1, thus connecting the drum to the engine shaft.

Mounted to one side and in parallel to the axis of the drum 4, is a short shaft 15, which has fixed thereto, one terminal of a spring 17, the opposite terminal of the spring being connected to the small drum 16. Having one terminal connected to and a portion thereof wound thereupon, is a cable 18, said cable 18 having several convolutions or coils about the drum 4, the other end being passed through the pulley sheave 19, and being operable on stationary engine at the dash board of the automobile or aeroplane by means of the handle 20. It will thus be seen, that the cable 18 may be pulled upon while the chauffeur or operator is seated within the automobile, and inasmuch as the spring 17 holds the cable taut about the drum 4, that the friction thereof will cause the drum 4 to be rotated and at the same time wind the spring 5.

The present device is so constructed, that a single pull of the cable 18 will rotate the drum 4 approximately one revolution, at which time, the arm 7 is brought into engagement with the small pin 21 of the drum 16 to impart a rapid rotation to the drum 16 to cause a slack in the cable 18, so that when the cable 18 is released by the operator, the spring 17 will readily draw the cable which due to the slackening, is loosened about the pulley or drum 4, upon the drum 16, the spring 5 returning the drum 4 to its initial starting position, as clearly shown in Fig. 4. In the position as shown in Fig. 5, the arm 7 is just brought into contact with the pin 21 to impart the rapid rotation to the drum 16 and thus release the cable 18.

It will thus be seen that in operating the present device, it is merely necessary for the operator to depress the foot treadle 14 so as to place the clutch members 2 and 1 in engagement, and while held in such engagement to pull upon the cable by gripping the handle 20, thus imparting the necessary rotation to the drum 4, and consequently to the engine shaft, as before stated the arm 7 being brought into engagement with the pin 21 so as to impart rapid rotation to the drum 16 to produce the necessary slack at a time when the drum 4 has been rotated approximately one revolution. This action as before stated, permits the loosening of the cable so that the drum 16 will rapidly return the cable to initial or starting position.

What is claimed is:

1. In an engine starter, a drum for connection with an engine shaft, an operating cable wound around said drum and adapted to be pulled for rotating said drum, a retracting device for the cable, and means for operably connecting the drum and retracting device whereby when the drum has rotated a predetermined amount it will actuate the retracting device to produce a slack in the cable between said device and drum.

2. In an engine starter, a drum for connection with an engine shaft, an operating cable wound upon said drum and adapted to be pulled for rotating the same, a retracting device for the cable including a drum upon which the cable is normally wound, and means operatively connecting said drums whereby when the first drum has rotated a predetermined amount it will rotate the second drum to produce a slack in the cable between the drums.

3. In an engine starter, a drum adapted for connection with an engine shaft, an actuating cable wound upon said drum and adapted to be pulled for rotating the same, a retracting device for the cable including a drum upon which the cable is normally wound, an eccentric pin carried by the second drum, and a tappet carried by the first drum and arranged to engage the eccentric pin and rotate the second drum when the first drum is rotated a predetermined amount, and thereby produce a slack in the cable between the drums.

In testimony that I claim the foregoing as my own, I have hereto affixed my signature in the presence of two witnesses.

MARY PIERSON MITCHELL.

Witnesses:
 HARRY L. RISINGER,
 F. G. SHUEY.